(12) United States Patent
Waniuk et al.

(10) Patent No.: US 10,197,335 B2
(45) Date of Patent: Feb. 5, 2019

(54) INLINE MELT CONTROL VIA RF POWER

(71) Applicants: Apple Inc., Cupertino, CA (US); Crucible Intellectual Property, LLC, Dana Point, CA (US)

(72) Inventors: Theodore A. Waniuk, Lake Forest, CA (US); Joseph Stevick, Glendora, CA (US); Sean O'Keeffe, Cupertino, CA (US); Dermot J. Stratton, San Francisco, CA (US); Joseph C. Poole, San Francisco, CA (US); Matthew S. Scott, Campbell, CA (US); Christopher D. Prest, San Francisco, CA (US)

(73) Assignees: Apple Inc., Cupertino, CA (US); Crucible Intellectual Property, LLC, Rancho Santa Margarita, CA (US)

( * ) Notice: Subject to any disclaimer, the term of this patent is extended or adjusted under 35 U.S.C. 154(b) by 26 days.

(21) Appl. No.: 13/651,654

(22) Filed: Oct. 15, 2012

(65) Prior Publication Data
US 2014/0102661 A1    Apr. 17, 2014

(51) Int. Cl.
*B22D 17/20*  (2006.01)
*B22D 17/10*  (2006.01)
(Continued)

(52) U.S. Cl.
CPC .............. *F27D 11/06* (2013.01); *B22D 17/04* (2013.01); *B22D 17/10* (2013.01);
(Continued)

(58) Field of Classification Search
CPC ................ B22D 17/10; B22D 17/2015; B22D 17/2038; F27D 11/06
See application file for complete search history.

(56) References Cited

U.S. PATENT DOCUMENTS 1,943,802 A * 1/1934 Northrup ................... 373/146
3,014,255 A * 12/1961 Bussard et al. ............ 75/10.14
(Continued)

FOREIGN PATENT DOCUMENTS

CN    1202402 A    12/1998
CN    1449313 A    10/2003
(Continued)

OTHER PUBLICATIONS

Inoue et al., "Bulk amorphous alloys with high mechanical strength and good soft magnetic properties in Fe—Tm—B(Tm=IV-VIII group transition metal) system", Appl. Phys. Lett., vol. 710, p. 464 (1997).
(Continued)

*Primary Examiner* — Kevin E Yoon
*Assistant Examiner* — Jacky Yuen
(74) *Attorney, Agent, or Firm* — Brownstein Hyatt Farber Schreck, LLP

(57) ABSTRACT

Various embodiments provide apparatus and methods for melting materials and for containing the molten materials within melt zone during melting. Exemplary apparatus may include a vessel configured to receive a material for melting therein; a load induction coil positioned adjacent to the vessel to melt the material therein; and a containment induction coil positioned in line with the load induction coil. The material in the vessel can be heated by operating the load induction coil at a first RF frequency to form a molten material. The containment induction coil can be operated at a second RF frequency to contain the molten material within the load induction coil. Once the desired temperature is achieved and maintained for the molten material, operation of the containment induction coil can be stopped and the molten material can be ejected from the vessel into a mold through an ejection path.

19 Claims, 7 Drawing Sheets

(51) Int. Cl.

| | | |
|---|---|---|
| *F27D 11/06* | (2006.01) | |
| *B22D 25/06* | (2006.01) | |
| *B22D 27/04* | (2006.01) | |
| *B22D 27/20* | (2006.01) | |
| *B22D 41/01* | (2006.01) | |
| *C22C 45/00* | (2006.01) | |
| *C22C 45/10* | (2006.01) | |
| *B22D 18/06* | (2006.01) | |
| *B22D 37/00* | (2006.01) | |
| *H05B 6/36* | (2006.01) | |
| *B22D 17/04* | (2006.01) | |
| *H05B 6/44* | (2006.01) | |
| *C22C 45/02* | (2006.01) | |
| *F27D 3/00* | (2006.01) | |
| *F27D 3/14* | (2006.01) | |
| *F27D 11/12* | (2006.01) | |
| *H05B 6/06* | (2006.01) | |
| *H05B 6/30* | (2006.01) | |

(52) U.S. Cl.
CPC ......... *B22D 17/2038* (2013.01); *B22D 18/06* (2013.01); *B22D 25/06* (2013.01); *B22D 27/04* (2013.01); *B22D 27/20* (2013.01); *B22D 37/00* (2013.01); *B22D 41/01* (2013.01); *C22C 45/00* (2013.01); *C22C 45/003* (2013.01); *C22C 45/008* (2013.01); *C22C 45/02* (2013.01); *C22C 45/10* (2013.01); *F27D 3/0025* (2013.01); *F27D 3/14* (2013.01); *F27D 11/12* (2013.01); *H05B 6/067* (2013.01); *H05B 6/30* (2013.01); *H05B 6/36* (2013.01); *H05B 6/367* (2013.01); *H05B 6/44* (2013.01); *Y02P 10/253* (2015.11)

(56) References Cited

U.S. PATENT DOCUMENTS

| | | | |
|---|---|---|---|
| 3,671,029 A | 6/1972 | Karlsson et al. | |
| 3,731,727 A | 5/1973 | Mitamura et al. | |
| 3,793,468 A | 2/1974 | Akers | |
| 4,040,845 A | 8/1977 | Richerson et al. | |
| 4,135,568 A | 1/1979 | Brooks | |
| 4,254,933 A | 3/1981 | Netto | |
| 4,265,294 A | 5/1981 | Gaule et al. | |
| 4,550,412 A | 10/1985 | Holcombe et al. | |
| 4,612,973 A | 9/1986 | Whang | |
| 4,678,024 A | 7/1987 | Hull et al. | |
| 4,693,299 A | 9/1987 | Kuznetsov et al. | |
| 4,799,532 A | 1/1989 | Mizuhara | |
| 4,887,798 A | 12/1989 | Julius | |
| 5,003,551 A | 3/1991 | Mortimer | |
| 5,087,804 A | 2/1992 | McGaffigan | |
| 5,288,344 A | 2/1994 | Peker et al. | |
| 5,333,646 A * | 8/1994 | Delot ............................ 137/827 | |
| 5,368,659 A | 11/1994 | Peker et al. | |
| 5,487,421 A | 1/1996 | Gerber | |
| 5,511,605 A * | 4/1996 | Iwamoto ........................ 164/457 | |
| 5,579,825 A | 12/1996 | Shibata et al. | |
| 5,616,024 A | 4/1997 | Nobori et al. | |
| 5,618,359 A | 4/1997 | Lin et al. | |
| 5,711,363 A * | 1/1998 | Scruggs et al. ............... 164/113 | |
| 5,718,280 A * | 2/1998 | Matsuura et al. ............ 164/498 | |
| 5,735,975 A | 4/1998 | Lin et al. | |
| 5,896,642 A | 4/1999 | Peker et al. | |
| 5,976,247 A | 11/1999 | Hansen et al. | |
| 6,021,840 A | 2/2000 | Colvin | |
| 6,089,846 A * | 7/2000 | Collot et al. .................... 425/98 | |
| 6,189,600 B1 | 2/2001 | Taniguchi et al. | |
| 6,210,478 B1 | 4/2001 | Bewlay et al. | |
| 6,267,170 B1 | 7/2001 | Onuki et al. | |
| 6,267,171 B1 | 7/2001 | Onuki et al. | |
| 6,283,197 B1 | 9/2001 | Kono | |
| 6,325,868 B1 | 12/2001 | Kim et al. | |
| 6,371,195 B1 | 4/2002 | Onuki et al. | |
| 6,427,753 B1 | 8/2002 | Inoue et al. | |
| 6,502,624 B1 | 1/2003 | Williams et al. | |
| 6,875,293 B2 | 4/2005 | Peker | |
| 6,994,146 B2 * | 2/2006 | Wang ............................. 164/113 |
| 7,017,645 B2 | 3/2006 | Johnson et al. | |
| 7,235,910 B2 | 6/2007 | Decristofaro et al. | |
| 7,335,864 B2 * | 2/2008 | Peck ........................ F27B 5/14 |
| | | | 219/674 |
| 7,368,022 B2 | 5/2008 | Yim | |
| 7,377,303 B2 | 5/2008 | Go | |
| 7,488,170 B2 | 2/2009 | Yuasa et al. | |
| 7,575,040 B2 | 8/2009 | Johnson | |
| 7,708,844 B2 | 5/2010 | Muramatsu et al. | |
| 7,906,219 B2 | 3/2011 | Ohara et al. | |
| 2002/0005233 A1 | 1/2002 | Schirra et al. | |
| 2003/0201090 A1 * | 10/2003 | Nanto et al. ................... 164/312 |
| 2004/0055726 A1 * | 3/2004 | Hong ........................ B22D 1/00 |
| | | | 164/113 |
| 2004/0084171 A1 * | 5/2004 | Akers .................. B22D 17/007 |
| | | | 164/113 |
| 2005/0028961 A1 | 2/2005 | Toyoshima et al. | |
| 2005/0111518 A1 | 5/2005 | Roach et al. | |
| 2005/0242454 A1 | 11/2005 | Yuasa et al. | |
| 2006/0042773 A1 | 3/2006 | Eisen | |
| 2006/0254747 A1 | 11/2006 | Ishida et al. | |
| 2006/0278362 A1 | 12/2006 | Muramatsu et al. | |
| 2007/0079907 A1 | 4/2007 | Johnson et al. | |
| 2008/0118387 A1 | 5/2008 | Demetriou et al. | |
| 2008/0135136 A1 | 6/2008 | Demetriou et al. | |
| 2008/0305387 A1 | 12/2008 | Murray et al. | |
| 2009/0162629 A1 | 6/2009 | Demetriou et al. | |
| 2009/0236494 A1 | 9/2009 | Hata et al. | |
| 2009/0321037 A1 | 12/2009 | Lewis et al. | |
| 2010/0084052 A1 | 4/2010 | Farmer et al. | |
| 2010/0098967 A1 | 4/2010 | Schroers et al. | |
| 2010/0230012 A1 | 9/2010 | Demetriou et al. | |
| 2010/0300148 A1 | 12/2010 | Demetriou et al. | |
| 2011/0011750 A1 | 1/2011 | Lovens et al. | |
| 2011/0079940 A1 | 4/2011 | Schroers et al. | |
| 2011/0108231 A1 | 5/2011 | Zheng et al. | |
| 2011/0164650 A1 | 7/2011 | Chen et al. | |
| 2012/0111522 A1 * | 5/2012 | Bullied et al. ................ 164/113 |
| 2014/0093658 A1 * | 4/2014 | Zhao ...................... B22D 19/10 |
| | | | 427/595 |
| 2014/0332176 A1 | 11/2014 | Waniuk et al. | |

FOREIGN PATENT DOCUMENTS

| | | |
|---|---|---|
| CN | 1876277 A | 12/2006 |
| CN | 201175762 Y | 1/2009 |
| DE | 19902002 | 7/2000 |
| EP | 0845316 | 6/1998 |
| EP | 1013363 | 6/2000 |
| EP | 1415740 | 5/2004 |
| FR | 1508992 A * | 1/1968 |
| FR | 2665654 | 2/1992 |
| GB | 392764 | 5/1933 |
| GB | 574914 | 1/1946 |
| GB | 784363 | 10/1957 |
| JP | 55036033 | 3/1980 |
| JP | 61119368 | 6/1986 |
| JP | H02070371 | 3/1990 |
| JP | 03067487 | 3/1991 |
| JP | H04162940 | 6/1992 |
| JP | 05131255 A * | 5/1993 |
| JP | H0505200513 | 8/1993 |
| JP | H0683888 A | 3/1994 |
| JP | H06114523 | 4/1994 |
| JP | H06114523 A | 4/1994 |
| JP | 6212205 | 8/1994 |
| JP | 8013111 | 1/1996 |
| JP | H08187566 A | 7/1996 |

(56) References Cited

FOREIGN PATENT DOCUMENTS

| | | |
|---|---|---|
| JP | 9272929 | 10/1997 |
| JP | A 09323146 | 12/1997 |
| JP | 2000024767 | 1/2000 |
| JP | 2000119826 | 4/2000 |
| JP | 2000119826 A | 4/2000 |
| JP | 2000326065 | 11/2000 |
| JP | 2001018053 | 1/2001 |
| JP | 2001071113 | 3/2001 |
| JP | 2001259821 | 9/2001 |
| JP | 2001303218 | 10/2001 |
| JP | A 2002066707 | 3/2002 |
| JP | 2004050269 | 2/2004 |
| JP | A 2005205422 | 8/2005 |
| JP | 2006289466 | 10/2006 |
| JP | A 2007209993 | 8/2007 |
| JP | 2008-238264 | 10/2008 |
| JP | 2009068101 | 4/2009 |
| JP | A 2009139905 | 6/2009 |
| JP | 2009172627 | 8/2009 |
| JP | 2009173964 | 8/2009 |
| JP | 2010036210 | 2/2010 |
| JP | 2010028223 A | 9/2010 |
| JP | 2010208223 | 9/2010 |
| JP | A 2011147961 | 8/2011 |
| KR | 10-2001-0040915 | 5/2001 |
| WO | WO0037201 | 6/2000 |
| WO | WO0240727 | 5/2002 |
| WO | WO2005004559 | 1/2005 |
| WO | WO2006127792 | 11/2006 |
| WO | WO2008046219 | 4/2008 |
| WO | WO2009067512 | 5/2009 |
| WO | WO2010108744 | 9/2010 |
| WO | WO2010111701 | 9/2010 |

OTHER PUBLICATIONS

Shen et al., 01., "Bulk Glassy Co43Fe2OTa5.5B31.5 Alloy with High Glass-Forming Ability and Good Soft Magnetic Properties", Materials Transactions, vol. 42 No. 10 (2001) pp. 2136-2139.
International Search Report issued in PCT/US2011/054153, dated Jun. 13, 2012.
McDeavitt et al., "High Temperature Interaction Behavior at Liquid Metal-Ceramic Interfaces", Journal of Materials Engineering and Performance, vol. 11, Aug. 2002.
Kargahi et al., "Analysis of failure of conducting crucible used in induction metal", Aug. 1988.
Inoue et al., "Microstructure and Properties of Bulky AlNiCe Alloys with Amorphous Surface Layer Prepared by High-Pressure Die Casting", Materials Transactions, JIM, vol. 35, No. 11 (1994), pp. 808-813.
International Search Report issued in PCT/US2011/052354, dated Mar. 16, 2012.
Wolf, S.; R.N. Tauber (1986),Silicon Processing for the VLSI Era: vol. 1—Process Technology. Lattice Press. pp. 531-534, 546.
Kohler, Michael (1999). Etching in Microsystem Technology. John Wiley & Son Ltd. p. 329.
Walker, Perrin; William H. Tarn (1991), CRC Handbook of Metal Etchants. pp. 287-291.
Japanese Office Action, Japanese Application No. 2013-213211, dated Oct. 27, 2014.
Korean Intellectual Property Office (KIPO), Notice of Preliminary Rejection, Korean Patent Application No. 10-2013-122694 dispatch dated Jul. 14, 2014.
Chinese Patent Application No. 201310481407.6; First Office Action dated May 6, 2015, English translation.
Chinese Patent Application No. 201310481407.6; Second Office Action dated Mar. 22, 2016, English translation.
Japanese Patent Application No. 2013-213211, Final Rejection dated May 22, 2015, English translation.

* cited by examiner

1ST INDUCTION COIL
= HEATING COIL

2ND INDUCTION COIL
= CONTAINMENT COIL

TAP ALLOWS COILS 1 AND 2 TO BE INDEPENDENTLY CONTROLLED

INLINE MELT CONTROL VIA RF POWER

FIELD

The present disclosure is generally related to apparatus and methods for melting materials and for containing the molten materials within melt zone during melting.

BACKGROUND

Some injection molding machines use an induction coil to melt material before injecting the material into a mold. However, in horizontally disposed machines where the material is melted in a vessel positioned for horizontal ejection, magnetic fluxes from the induction coil tend to cause the melt to move unpredictably, e.g., to flow towards and/or out of the melt zone, which can make it difficult to control the uniformity and temperature of the melt.

Current solutions for melting in vessels designed for horizontal ejection include use of a gate that is in contact with the melt and physically blocks the melt from flowing (horizontally) out of the induction coil in the melt zone. Problems arise, however, due to gate configurations, wherein the gate is a point of contact with the melt and impurities may be introduced by the gate. In addition, the gate configuration may reduce the space available for the melt zone because the gate must be actuated up and down in order to allow the melt to flow. Further, the melt may undesirably flow towards and/or out of the horizontal ejection path of the vessel due to challenge of the timing control as when to raise the gate during the injection process of the melt. Furthermore, the gate is potentially a consumable part and needs to be replaced after a certain number of uses.

It is desirable to contain the melt in the melt zone of horizontally designed systems at desired high temperatures when it is heated or melted, but without introducing a gate to physically block the melt.

SUMMARY

A proposed solution according to embodiments herein for melting materials (e.g., metals or metal alloys) in a vessel is to contain the melt or molten material within melt zone.

In accordance with various embodiments, there is provided an apparatus. The apparatus may include a vessel configured to receive a material for melting therein; a load induction coil positioned adjacent to the vessel to melt the material therein; and a containment induction coil positioned in line with the load induction coil. The containment induction coil is configured to contain the melt within the load induction coil.

In accordance with various embodiments, there is provided a melting method using an apparatus. The apparatus may include a vessel configured to receive a material for melting therein; a load induction coil positioned adjacent to the vessel to melt the material therein; and a containment induction coil positioned in line with the load induction coil. The material in the vessel can be heated by operating the load induction coil at a first RF frequency to form a molten material. While heating, the containment induction coil can be operated at a second RF frequency to contain the molten material within the load induction coil.

In accordance with various embodiments, there is provided a melting method using an apparatus. The apparatus may include a vessel configured to receive a material for melting therein; a load induction coil positioned adjacent to the vessel to melt the material therein; and a containment induction coil positioned in line with the load induction coil. The material in the vessel can be heated by operating the load induction coil at a first RF frequency to form a molten material. While heating, the containment induction coil can be operated at a second RF frequency to contain the molten material within the load induction coil. Once the desired temperature is achieved and maintained for the molten material, operation of the containment induction coil can be stopped and the molten material can be ejected from the vessel into a mold through an ejection path.

Also, in accordance with an embodiment, the material for melting comprises a BMG feedstock, and a BMG part may be formed.

Further, in an embodiment, the first induction coil and the second induction coil are part of the same coil, wherein they are connected to each other electrically but configured in an array such that a non-uniform magnetic field is produced. In another embodiment, the first and the second induction coils are part of the same coil and associated with an electrical tap that allow independent control of either or both coils, i.e., control of at least one portion or one side of the single coil, so that the magnetic field can be changed.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1A:
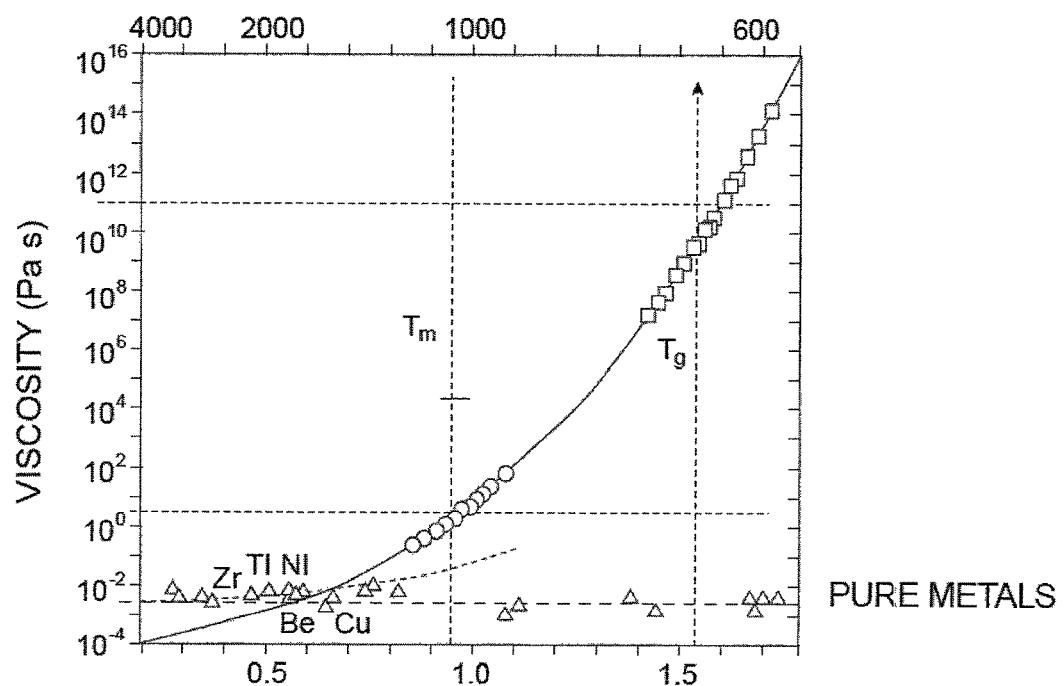
FIG. 1A provides a temperature-viscosity diagram of an exemplary bulk solidifying amorphous alloy.

FIG. 1A (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 1B:
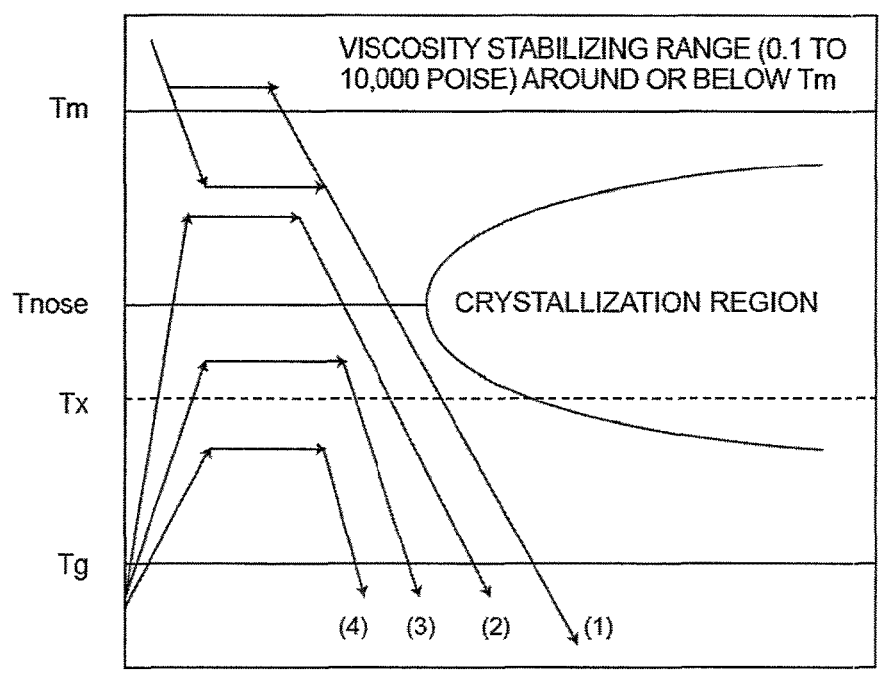
FIG. 1B provides a schematic of a time-temperature-transformation (TTT) diagram for an exemplary bulk solidifying amorphous alloy.

FIG. 1B (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 1B. In FIG. 1B, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 1B, Tx is shown as a dashed line as Tx can vary from close to Tm to close to Tg.

The schematic TTT diagram of FIG. 1B shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 1B, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table.

Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can include multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can include a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can include multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

$$G(x,x')=\langle s(x),s(x')\rangle.$$

In the above function, s is the spin quantum number and x is the distance function within the particular system. This function is equal to unity when x=x' and decreases as the distance |x−x'| increases. Typically, it decays exponentially to zero at large distances, and the system is considered to be disordered. If, however, the correlation function decays to a constant value at large |x−x'|, then the system can be said to possess long-range order. If it decays to zero as a power of the distance, then it can be called quasi-long-range order. Note that what constitutes a large value of |x−x'| is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically includes a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can include the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™, such as Vitreloy-1 and Vitreloy-101, as fabricated by Liquidmetal Technologies, CA, USA. Some examples of amorphous alloys of the different systems are provided in Table 1 and Table 2.

TABLE 1

Exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 6 | Pt | Cu | Ag | P | B | Si | | |
| | 74.70% | 1.50% | 0.30% | 18.0% | 4.00% | 1.50% | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr | Ti | Cu | Ni | Be | |
| | 41.20% | 13.80% | 12.50% | 10.00% | 22.50% | |
| 2 | Zr | Ti | Cu | Ni | Be | |
| | 44.00% | 11.00% | 10.00% | 10.00% | 25.00% | |
| 3 | Zr | Ti | Cu | Ni | Nb | Be |
| | 56.25% | 11.25% | 6.88% | 5.63% | 7.50% | 12.50% |
| 4 | Zr | Ti | Cu | Ni | Al | Be |
| | 64.75% | 5.60% | 14.90% | 11.15% | 2.60% | 1.00% |
| 5 | Zr | Ti | Cu | Ni | Al | |
| | 52.50% | 5.00% | 17.90% | 14.60% | 10.00% | |
| 6 | Zr | Nb | Cu | Ni | Al | |
| | 57.00% | 5.00% | 15.40% | 12.60% | 10.00% | |
| 7 | Zr | Cu | Ni | Al | | |
| | 50.75% | 36.23% | 4.03% | 9.00% | | |
| 8 | Zr | Ti | Cu | Ni | Be | |
| | 46.75% | 8.25% | 7.50% | 10.00% | 27.50% | |
| 9 | Zr | Ti | Ni | Be | | |
| | 21.67% | 43.33% | 7.50% | 27.50% | | |
| 10 | Zr | Ti | Cu | Be | | |
| | 35.00% | 30.00% | 7.50% | 27.50% | | |
| 11 | Zr | Ti | Co | Be | | |
| | 35.00% | 30.00% | 6.00% | 29.00% | | |
| 12 | Zr | Ti | Fe | Be | | |
| | 35.00% | 30.00% | 2.00% | 33.00% | | |
| 13 | Au | Ag | Pd | Cu | Si | |
| | 49.00% | 5.50% | 2.30% | 26.90% | 16.30% | |
| 14 | Au | Ag | Pd | Cu | Si | |
| | 50.90% | 3.00% | 2.30% | 27.80% | 16.00% | |
| 15 | Pt | Cu | Ni | P | | |
| | 57.50% | 14.70% | 5.30% | 22.50% | | |
| 16 | Zr | Ti | Nb | Cu | Be | |
| | 36.60% | 31.40% | 7.00% | 5.90% | 19.10% | |
| 17 | Zr | Ti | Nb | Cu | Be | |
| | 38.30% | 32.90% | 7.30% | 6.20% | 15.30% | |
| 18 | Zr | Ti | Nb | Cu | Be | |
| | 39.60% | 33.90% | 7.60% | 6.40% | 12.50% | |
| 19 | Cu | Ti | Zr | Ni | | |
| | 47.00% | 34.00% | 11.00% | 8.00% | | |
| 20 | Zr | Co | Al | | | |
| | 55.00% | 25.00% | 20.00% | | | |

Other exemplary ferrous metal-based alloys include compositions such as those disclosed in U.S. Patent Application Publication Nos. 2007/0079907 and 2008/0305387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)-C—B, Co—Cr—Mo-Ln-C—B, Fe—Mn—Cr—Mo—(Y,Ln)-C—B, (Fe, Cr, Co)—(Mo,Mn)—(C,B)—Y, Fe—(Co,Ni)—(Zr,Nb,Ta)—(Mo,W)—B, Fe—(Al,Ga)—(P,C,B,Si,Ge), Fe—(Co, Cr,Mo,Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM. Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The amorphous alloy can also be one of the Pt- or Pd-based alloys described by U.S. Patent Application Publication Nos. 2008/0135136, 2009/0162629, and 2010/0230012. Exemplary compositions include Pd44.48Cu32.35Cu4.05P19.11, Pd77.5Ag6Si9P7.5, and Pt74.7Cu1.5Ag0.3P18B4Si1.5.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

A proposed solution according to embodiments herein for melting materials (e.g., metals or metal alloys) in a vessel is to contain the melt or molten material within melt zone.

Embodiments relate to apparatus and methods to control the position and shape of molten feedstock in an inline melting apparatus, a coil operating at a lower frequency than the main helical melt coil and positioned near the end of the melt coil is used to exert a force on molten alloy contained within the latter. The Laplace forces generated by the "containment" coil act against those generated by the melt coil (which tend to push the alloy out) without substantially reducing the inductive heating of the alloy. This allows the alloy to be melted and controllably introduced into another system such as a cold chamber die caster for subsequent forming. The advantages of the apparatus and method would be to allow the alloy to be electromagnetically contained without using a physical obstruction to contain the alloy.

FIGS. 2A to 2D shows various embodiments of the apparatus. The apparatus could comprise a vessel configured to receive a material such as an ingot shown in FIGS. 2A to 2D for melting therein. Shown in the embodiments are a first induction coil, configured to melt the material therein; and a second induction coil, positioned in line with the first induction coil, wherein the second induction coil or a combination of the first induction coil and the second induction coil is configured to function as a gate or a valve for containing movement of the molten material in a horizontal direction within the vessel. In one embodiment, the first induction coil is a load or heating coil and the second induction coil is a containing coil, Alternatively, in another embodiment, the first induction coil is a containing coil and the second induction coil is a heating coil. The heating induction coil can be used to tune the frequency to maximize thermal energy generation on a meltable material (e.g., in the form of an ingot). The containing induction coil can be used to tune the frequency to maximize forces applied to the melt.

For explanatory purposes only, it should be understood that FIGS. 2A-2D reference injection of molten material into a mold in a horizontal direction, out of a vessel, from right to left. Accordingly, in these illustrative embodiments, first induction coil is a heating coil and second induction coil is a containing coil. However, the direction of movement and the heating/containing coil assignments are not meant to be limiting.

In any of these embodiments, the material for melting could comprise a BMG feedstock, and the apparatus is configured to mold the material into a BMG part.

Figure 2A:
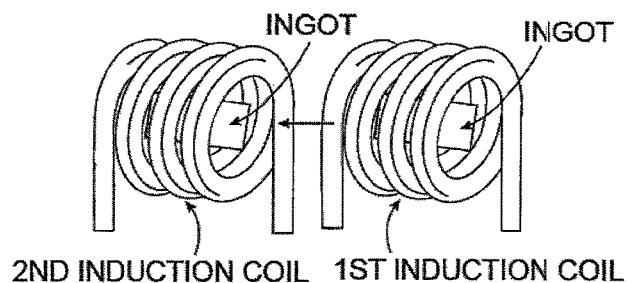
FIGS. 2A to 2D show various exemplary embodiments of the arrangements of the first induction coil and a second induction, for melting and containment of a material.
Figure 2B:
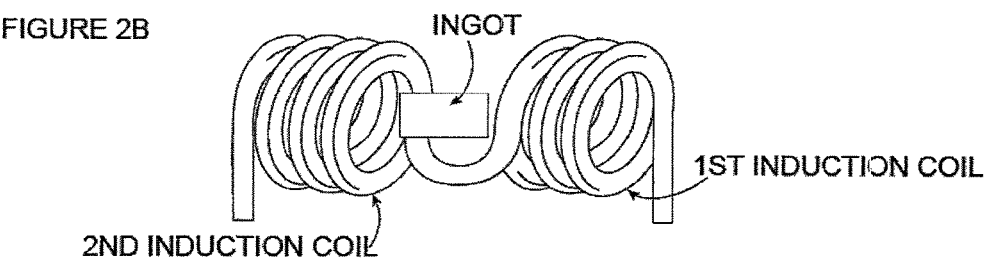
Figure 2C:
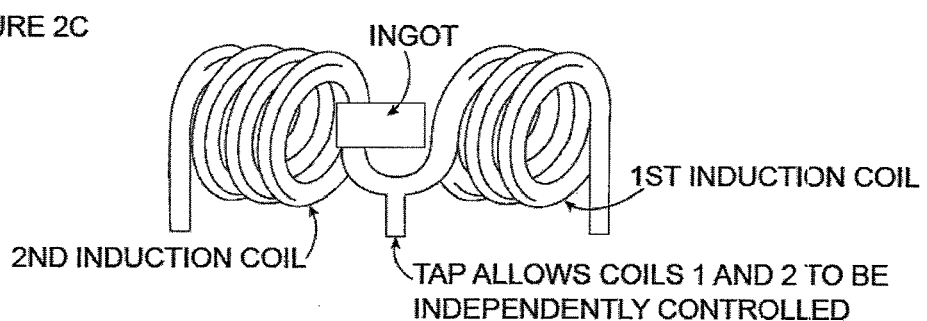

In two exemplary embodiments, the first induction coil and the second induction coil are part of a single induction coil (shown in FIG. 2B) or two distinct induction coils (shown in FIG. 2A). The coils are used to control the melt via RF power. For example, the second coil (e.g., containment coil) may be provided on the left and the first coil (e.g., heating coil) on the right. They can be connected and configured to operate at the same frequency. Accordingly, FIG. 2B shows a coil configuration that performs both heating and containment functions. In operation, the melt temperature and stirring remains relatively uniform in the region between the first and second coils.

The frequencies of the first and second induction coils may be different. If using a single coil to perform both functions, i.e., heating and containing, then only one frequency may run. This results in a selected frequency that is a compromise between the frequencies for heating the material and for optimizing force applied to the melt. In accordance with an embodiment, the first induction coil and the second induction coil are part of a single induction coil having an electrical tap (shown in FIG. 2C) therein configured to independently control the first induction coil and the second induction coil. The electrical tap allows independent control of either or both coils, so that the magnetic field can be rapidly changed. In an embodiment wherein a first and second induction coil are part of a single coil, the electrical tap can allow control of at least one portion or one side of the single coil.

Optionally, one or both of the first induction coil and the second induction coil could comprise a taper shape or cylindrical shape in FIGS. 2A-2D.

Figure 2D:
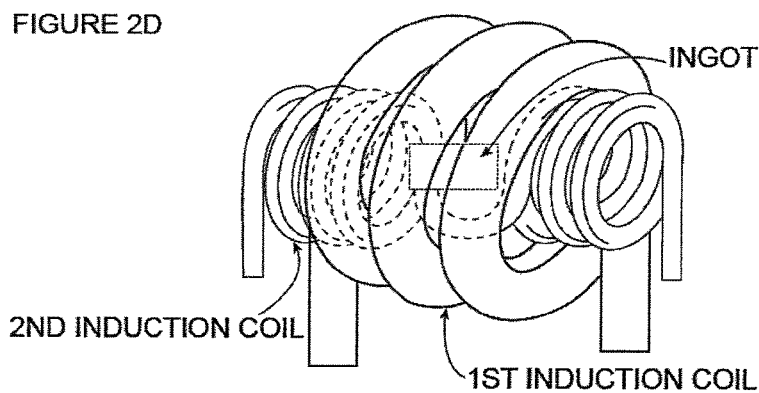

The second induction coil could be wrapped around the first induction coil as or vice-versa as shown in FIG. 2D. FIG. 2D shows one example, in accordance with an embodiment, of de-coupling the first (e.g., heating) and second (e.g., containing) induction coils, where the second coil uses similar principles described above. The first and second induction coils may have different frequencies. For example, the second induction coil could generally have a lower RF frequency than the first induction coil.

Also, during melting of meltable material, it is also envisioned that a plunger of the system (e.g., plunger rod 330 of system 300) may be configured to assist in containing the meltable material within a vessel. For example, in an embodiment wherein a plunger is configured to move in a horizontal direction from right to left to inject the material into a mold (thus ejecting the molten material from the vessel), the plunger may be positioned to contain a melt from a right side (adjacent to first induction coil) to keep molten material from being ejected out the wrong side. The coil configuration may be designed to contain the melt on the opposite side leading to the mold (left side). In an embodiment, the plunger may be used in with and/or in addition to any of the coil configurations shown in FIG. 2A, 2B, 2C, or 2D.

In an embodiment, the meltable material is contained on its bottom by a water-cooled boat, vessel, or container, that may or may not comprise with a substantially U-shaped channel.

The vessel (not shown in FIGS. 2A to 2D, but instead an ingot within the vessel is shown) could be positioned along a horizontal axis of the first induction coil or the second induction such that movement of the material in the vessel is in a horizontal direction along an ejection path of the vessel. The second induction coil could be positioned near an ejection end of the vessel, for example, shown in FIG. 2B.

The apparatus could further comprise an additional induction coil located at either an ejection end of the vessel or an opposite side of the ejection end of the vessel. An additional induction coil is not shown in FIGS. 2A to 2D. The vessel could further comprise one or more temperature regulating channels (not shown in FIGS. 2A to 2D) configured to flow a fluid therein for regulating a temperature of the vessel during melting of the material. The apparatus further comprise a mold (not shown in FIGS. 2A to 2D) configured to receive the melt from the vessel and to mold the melt into the BMG part. In FIGS. 2A to 2D, the second induction coil or the combination of the first induction coil and the second induction coil is configured to function as a valve to control movement of the melt from the vessel through an injection path to the mold (not shown in FIGS. 2A to 2D).

In accordance with various embodiments, there is provided an apparatus. The apparatus may include a vessel configured to receive a material for melting therein; a load induction coil positioned adjacent to the vessel to melt the material therein; and a containment induction coil positioned in line with the load induction coil. The containment induction coil is configured to contain the melt within the load induction coil.

In accordance with various embodiments, there is provided a melting method using an apparatus. The apparatus may include a vessel configured to receive a material for melting therein; a load induction coil positioned adjacent to the vessel to melt the material therein; and a containment induction coil positioned in line with the load induction coil. The material in the vessel can be heated by operating the load induction coil at a first RF frequency to form a molten material. While the melt is heated and/or maintained at desired temperature, the containment induction coil can be operated at a second RF frequency to contain the molten material within the load induction coil.

In accordance with various embodiments, there is provided a melting method using an apparatus. The apparatus may include a vessel configured to receive a material for melting therein; a load induction coil positioned adjacent to the vessel to melt the material therein; and a containment induction coil positioned in line with the load induction coil.

The material in the vessel can be heated by operating the load induction coil at a first RF frequency to form a molten material. While heating, the containment induction coil can be operated at a second RF frequency to contain the molten material within the load induction coil. Once the desired temperature is achieved and maintained for the molten material, operation of the containment induction coil can be stopped and the molten material can be ejected from the vessel into a mold through an ejection path.

The methods, techniques, and devices illustrated herein are not intended to be limited to the illustrated embodiments. As disclosed herein, an apparatus or a system (or a device or a machine) is configured to perform melting of and injection molding of material(s) (such as amorphous alloys). The apparatus is configured to process such materials or alloys by melting at higher melting temperatures before injecting the molten material into a mold for molding. As further described below, parts of the apparatus are positioned in-line with each other. In accordance with some embodiments, parts of the apparatus (or access thereto) are aligned on a horizontal axis. The following embodiments are for illustrative purposes only and are not meant to be limiting.

Figure 3:
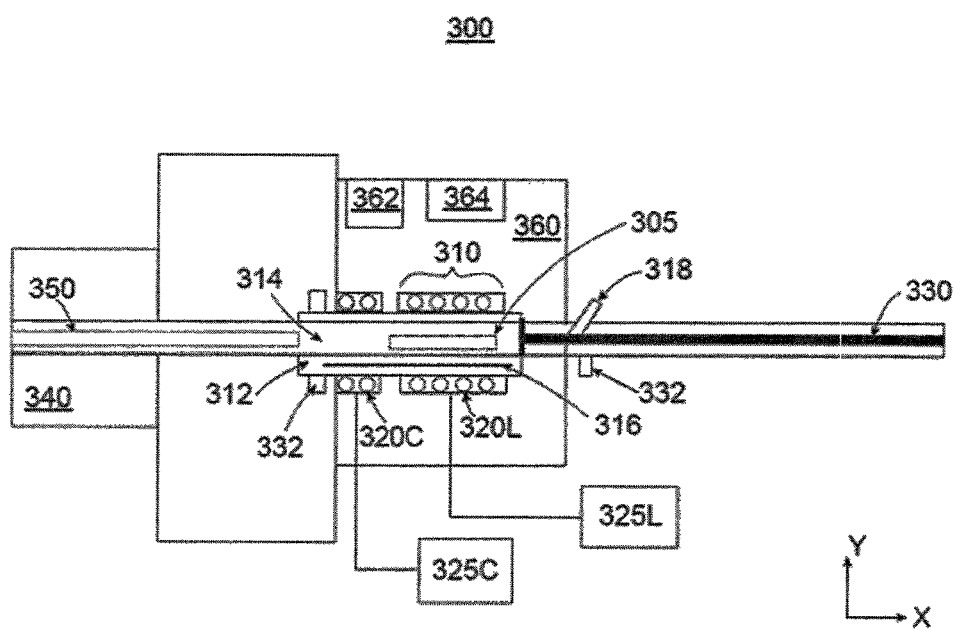
FIG. 3 shows a schematic diagram of an exemplary injection molding system/apparatus in accordance with various embodiments of the present teachings.

FIG. 3 illustrates a schematic diagram of such an exemplary apparatus. More specifically, FIG. 3 illustrates an injection molding apparatus 300. In accordance with an embodiment, injection molding system 300 can include a melt zone 310 configured to melt meltable material 305 received therein, and at least one plunger rod 330 configured to eject molten material 305 from melt zone 310 and into a mold 340. In an embodiment, at least plunger rod 330 and melt zone 310 are provided in-line and on a horizontal axis (e.g., X axis), such that plunger rod 330 is moved in a horizontal direction (e.g., along the X-axis) substantially through melt zone 310 to move the molten material 305 into mold 340. The mold can be positioned adjacent to the melt zone.

The meltable material can be received in the melt zone in any number of forms. For example, the meltable material may be provided into melt zone 310 in the form of an ingot (solid state), a semi-solid state, a slurry that is preheated, powder, pellets, etc. In some embodiments, a loading port (such as the illustrated example of an ingot loading port 318) may be provided as part of injection molding apparatus 300. Loading port 318 can be a separate opening or area that is provided within the machine at any number of places. In an embodiment, loading port 318 may be a pathway through one or more parts of the machine. For example, the material (e.g., ingot) may be inserted in a horizontal direction into the vessel 312 by plunger 330, or may be inserted in a horizontal direction from the mold side of the injection apparatus 300 (e.g., through mold 340 and/or through a transfer sleeve 350 into vessel 312). In other embodiments, the meltable material can be provided into melt zone 310 in other manners and/or using other devices (e.g., through an opposite end of the injection apparatus).

Melt zone 310 includes a melting mechanism configured to receive meltable material and to hold the material as it is heated to a molten state. The melting mechanism may be in the form of a vessel 312, for example, that has a body for receiving meltable material and configured to melt the material therein. A vessel as used throughout this disclosure is a container made of a material employed for heating substances to high temperatures. For example, in an embodiment, the vessel may be a crucible, such as a boat style crucible, or a skull crucible. In an embodiment, vessel 312 is a cold hearth melting device that is configured to be utilized for meltable material(s) while under a vacuum (e.g., applied by a vacuum device or pump at a vacuum port 332). In one embodiment, described further below, the vessel is a temperature regulated vessel.

Vessel 312 may also have an inlet for inputting material (e.g., feedstock) into a receiving or melting portion 314 of its body. In the embodiments shown in the Figures, the body of vessel 312 may include a substantially U-shaped structure. However, this illustrated shape is not meant to be limiting. Vessel 312 can include any number of shapes or configurations. The body of the vessel has a length and can extend in a longitudinal and horizontal direction, such that molten material is removed horizontally therefrom using plunger 330. For example, the body may include a base with side walls extending vertically therefrom. The material for heating or melting may be received in a melting portion 314 of the vessel. Melting portion 314 is configured to receive meltable material to be melted therein. For example, melting portion 314 has a surface for receiving material. Vessel 312 may receive material (e.g., in the form of an ingot) in its melting portion 314 using one or more devices of an injection apparatus for delivery (e.g., loading port and plunger).

In an embodiment, body and/or its melting portion 314 may include substantially rounded and/or smooth surfaces. For example, a surface of melting portion 314 may be formed in an arc shape. However, the shape and/or surfaces of the body are not meant to be limiting. The body may be an integral structure, or formed from separate parts that are joined or machined together. The body of vessel 312 may be formed from any number of materials (e.g., copper, silver), include one or more coatings, and/or configurations or designs. For example, one or more surfaces may have recesses or grooves therein.

The body of vessel 312 may be configured to receive the plunger rod there-through in a horizontal direction to move the molten material. That is, in an embodiment, the melting mechanism is on the same axis as the plunger rod, and the body can be configured and/or sized to receive at least part of the plunger rod. Thus, plunger rod 330 can be configured to move molten material (after heating/melting) from the vessel by moving substantially through vessel 312, and into mold 340. Referencing the illustrated embodiment of apparatus 300 in FIG. 3, for example, plunger rod 330 would move in a horizontal direction from the right towards the left, through vessel 312, moving and pushing the molten material towards and into mold 340.

To heat melt zone 310 and melt the meltable material received in vessel 312, injection apparatus 300 also includes a heat source that is used to heat and melt the meltable material.

At least melting portion 314 of the vessel, if not substantially the entire body itself, is configured to be heated such that the material received therein is melted. Heating is accomplished using, for example, an induction source 320L positioned within melt zone 310 that is configured to melt the meltable material. In an embodiment, induction source 320L is positioned adjacent vessel 312. For example, induction source 320L may be in the form of a coil positioned in a helical pattern substantially around a length of the vessel body. Accordingly, vessel 312 may be configured to inductively melt a meltable material (e.g., an inserted ingot) within melting portion 314 by supplying power to induction source/coil 320L, using a power supply or source 325. Thus, the melt zone 310 can include an induction zone. Induction coil 320L is configured to heat up and melt any material that is contained by vessel 312 without melting and wetting vessel 312. Induction coil 320L emits radiofrequency (RF)

waves towards vessel 312. As shown, the body and coil 320L surrounding vessel 312 may be configured to be positioned in a horizontal direction along a horizontal axis (e.g., X axis).

In one embodiment, the vessel 312 is a temperature regulated vessel. Such a vessel may include one or more temperature regulating channels configured to flow a gas or a liquid (e.g., water, oil, or other fluid) therein for regulating a temperature of the body of vessel 312 during melting of material received in the vessel (e.g., to force cool the vessel). Such a forced-cool crucible can also be provided on the same axis as the plunger rod. The cooling channel(s) can assist in preventing excessive heating and melting of the body of the vessel 312 itself. Cooling channel(s) may be connected to a cooling system configured to induce flow of a gas or a liquid in the vessel. The cooling channel(s) may include one or more inlets and outlets for the fluid to flow there-through. The inlets and outlets of the cooling channels may be configured in any number of ways and are not meant to be limited. For example, cooling channel(s) may be positioned relative to melting portion 314 such that material thereon is melted and the vessel temperature is regulated (i.e., heat is absorbed, and the vessel is cooled). The number, positioning and/or direction of the cooling channel(s) should not be limited. The cooling liquid or fluid may be configured to flow through the cooling channel(s) during melting of the meltable material, when induction source 320L is powered.

After the material is melted in the vessel 312, plunger 330 may be used to force the molten material from the vessel 312 and into a mold 340 for molding into an object, a part or a piece. In instances wherein the meltable material is an alloy, such as an amorphous alloy, the mold 340 is configured to form a molded bulk amorphous alloy object, part, or piece. Mold 340 has an inlet for receiving molten material there-through. An output of the vessel 312 and an inlet of the mold 340 can be provided in-line and on a horizontal axis such that plunger rod 330 is moved in a horizontal direction through body 22 of the vessel to eject molten material and into the mold 340 via its inlet.

As previously noted, systems such as injection molding system 300 that are used to mold materials such as metals or alloys may implement a vacuum when forcing molten material into a mold or die cavity. Injection molding system 300 can further includes at least one vacuum source or pump that is configured to apply vacuum pressure to at least melt zone 310 and mold 340 at vacuum ports 312. The vacuum pressure may be applied to at least the parts of the injection molding system 300 used to melt, move or transfer, and mold the material therein. For example, the vessel 312, transfer sleeve 350, and plunger rod 330 may all be under vacuum pressure and/or enclosed in a vacuum chamber.

In an embodiment, mold 340 is a vacuum mold that is an enclosed structure configured to regulate vacuum pressure therein when molding materials. For example, in an embodiment, vacuum mold 340 includes a first plate (also referred to as an "A" mold or "A" plate), a second plate (also referred to as a "B" mold or "B" plate) positioned adjacently (respectively) with respect to each other. The first plate and second plate generally each have a mold cavity associated therewith for molding melted material there-between. The cavities are configured to mold molten material received there-between via an injection sleeve or transfer sleeve 350. The mold cavities may include a part cavity for forming and molding a part therein.

Generally, the first plate may be connected to transfer sleeve 350. In accordance with an embodiment, plunger rod 330 is configured to move molten material from vessel 312, through a transfer sleeve 350, and into mold 340. Transfer sleeve 350 (sometimes referred to as a shot sleeve, a cold sleeve or an injection sleeve in the art and herein) may be provided between melt zone 310 and mold 340. Transfer sleeve 350 has an opening that is configured to receive and allow transfer of the molten material there-through and into mold 340 (using plunger 330). Its opening may be provided in a horizontal direction along the horizontal axis (e.g., X axis). The transfer sleeve need not be a cold chamber. In an embodiment, at least plunger rod 330, vessel 312 (e.g., its receiving or melting portion), and opening of the transfer sleeve 350 are provided in-line and on a horizontal axis, such that plunger rod 330 can be moved in a horizontal direction through vessel 312 in order to move the molten material into (and subsequently through) the opening of transfer sleeve 350.

Molten material is pushed in a horizontal direction through transfer sleeve 350 and into the mold cavity(ies) via the inlet (e.g., in a first plate) and between the first and second plates. During molding of the material, the at least first and second plates are configured to substantially eliminate exposure of the material (e.g., amorphous alloy) there-between, e.g., to oxygen and nitrogen. Specifically, a vacuum is applied such that atmospheric air is substantially eliminated from within the plates and their cavities. A vacuum pressure is applied to an inside of vacuum mold 340 using at least one vacuum source that is connected via vacuum lines 332. For example, the vacuum pressure or level on the system can be held between $1\times10^{-1}$ to $1\times10^{-4}$ Torr during the melting and subsequent molding cycle. In another embodiment, the vacuum level is maintained between $1\times10^{-2}$ to about $1\times10^{-4}$ Torr during the melting and molding process. Of course, other pressure levels or ranges may be used, such as $1\times10^{-9}$ Torr to about $1\times10^{-3}$ Torr, and/or $1\times10^{-3}$ Torr to about 0.1 Torr. An ejector mechanism (not shown) is configured to eject molded (amorphous alloy) material (or the molded part) from the mold cavity between the first and second plates of mold 340. The ejection mechanism is associated with or connected to an actuation mechanism (not shown) that is configured to be actuated in order to eject the molded material or part (e.g., after first and second parts and are moved horizontally and relatively away from each other, after vacuum pressure between at least the plates is released).

Any number or types of molds may be employed in the apparatus 300. For example, any number of plates may be provided between and/or adjacent the first and second plates to form the mold. Molds known in the art as "A" series, "B" series, and/or "X" series molds, for example, may be implemented in injection molding system/apparatus 300.

A uniform heating of the material to be melted and maintenance of temperature of molten material in such an injection molding apparatus 300 assists in forming a uniform molded part. For explanatory purposes only, throughout this disclosure material to be melted is described and illustrated as being in the form of an ingot 305 that is in the form of a solid state feedstock; however, it should be noted that the material to be melted may be received in the injection molding system or apparatus 300 in a solid state, a semi-solid state, a slurry that is preheated, powder, pellets, etc., and that the form of the material is not limiting. In addition, the illustrated view of vessel 312 is a cross-sectional view taken along X-axis of a U-shaped boat/vessel for illustrative purposes only.

In an injection molding apparatus that is positioned inline and in a horizontal direction and to get the most power input into the material for melting, containing the material in the melt zone, adjacent to induction coil, is effective for a consistent melt cycle, rather than, for example, having molten material flow towards and/or out of the ejection path of the vessel.

Figure 4:
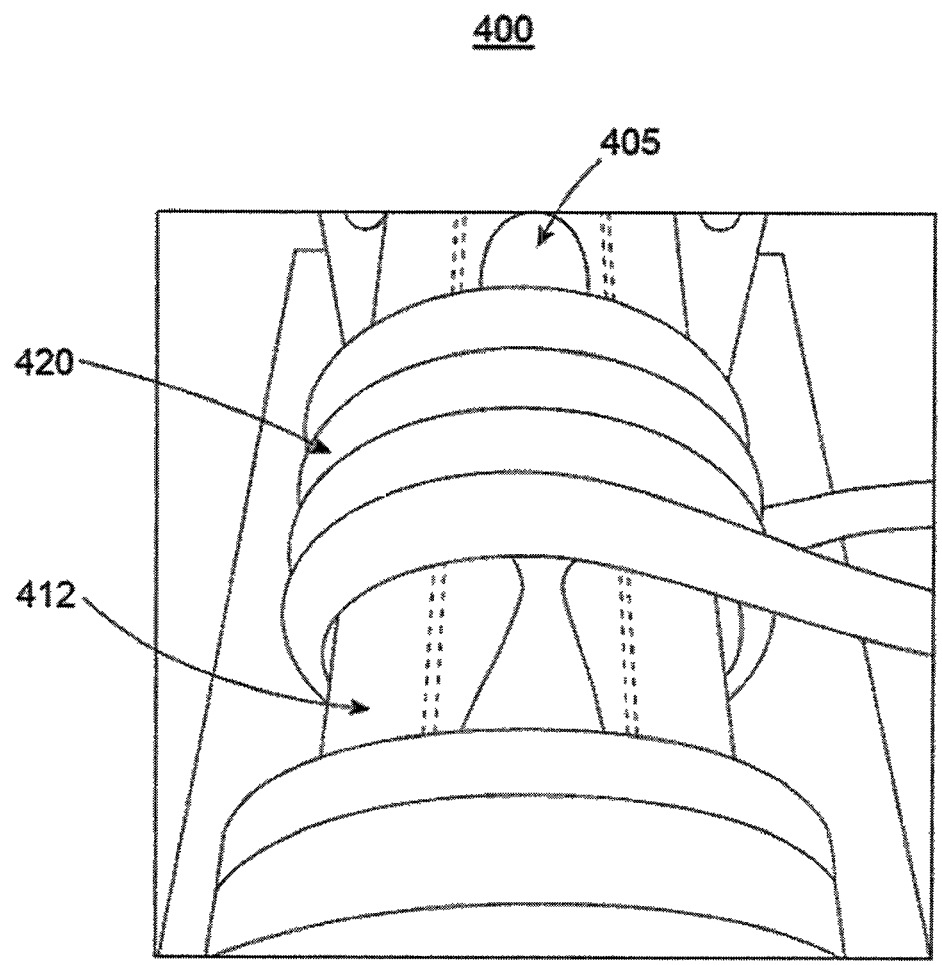
FIG. 4 depicts an injection molding system configured having an induction coil.

FIG. 4 depicts a current injection molding system configured having one induction coil 420. The coil 420 may impose forces on the material 405 for melting, e.g., metals/metal alloys, placed inside the vessel 410, and ultimately, when the material 405 is molten, the induction coil 420 imposes forces on the molten material 405 within the coil 420. These forces may act to squeeze the molten material inwards to the center of the vessel, as shown. Meanwhile, these forces may push the molten material 405 out of the induction coil 420 e.g., at the ends of the induction coil 420, while the molten material is being smoothed out during heating by the induction coil.

As disclosed herein, the exemplary injection molding apparatus/system 300 in FIG. 3 includes a plurality of separate induction coils, such as, for example, a load induction coil 320L and a containment induction coil 302C.

In embodiments, the induction coils 320L and 320C can emit radiofrequency (RF) waves towards the vessel 312. The coils 320L may or may not be tapered. The coils 320L and 320C may or may not be tapered. The Coils 320L and 320C may include, e.g., spherical coil. In embodiments, the coils may have the same or different shapes such that the generated RF fields can be tuned, e.g. be more directional as desired. For example, the containment induction coil 320C can be taper-shaped or cone-shaped coil, with the wide region spacing from, facing, the load induction coil 320L. By using the tuned RF fields, stronger forces can be generated by the containment induction coil 320C and imposed to the melt toward the load induction coil 320L. The melt/molten material can then be contained within the load induction coil 320L.

The containment induction coil 320C can be spaced apart but configured in line with the load induction coil 320L. The containment induction coil 320C can be configured near the ejection end of the melting zone 310. The load induction coil 320L can be configured for heating/melting the material 305 for melting placed in the melting portion 314 of the vessel 310. The containment induction coil 320C can be configured for positioning and/or containing the melt or the molten material within the load induction coil 320L during the heating/melting process. The containment induction coil 320C can prevent the melt or the molten material from flowing out of the load induction coil 320L and the material 305 in the vessel 312 can remain heated and molten. Likewise, the melt/molten material can be contained within the melt zone 310 of the apparatus/system 300 while it's being smoothed out and minimize heat loss.

In embodiments, the containment induction coil 320C and the load induction coil 320L can be operated at different frequencies in order to position/contain the melt, e.g., at melting temperatures. For example, the load induction coil 320L for heating/melting the moltable materials can operate at one frequency $f_{melting}$, while the containment induction coil 320C for containing melt/molten material can operate at a different frequency $f_{containment}$. In embodiments, $f_{melting}$, may be greater than $f_{containment}$. The containment induction coil 320C operating at a lower frequency may generate a stronger net force on the melt/molten material. The containment induction coil 320C may impose such force, e.g., Laplace forces, on the melt, to act against those generated by the load induction coil (which tend to push the melt out) and push the melt back to be contained within the load induction coil 320L.

The containment induction coil 320C and the load induction coil 320L are spaced apart and operated out of sync in frequencies. The magnetic fields generated by the coils 320C and 320L do not necessarily cancel out (although they may otherwise interact) with one another. In general, when two coils have coil turns, e.g., helical turns, in reversed or opposite directions, the magnetic fields generated may oppose to and cancel out with one another. In such region where the opposing turns are in effect, the materials to be melted cannot be heated and may tend to freeze onto the vessel due to cancellation of the magnetic fields.

As disclosed herein, by controlling frequencies, powers, interaction between magnetic fields, etc. of one or both of the load induction coil 320C and the containment induction coil 320, the materials 305 in the vessel 312 can be heated/melted and further contained within the load induction coil 320C.

In embodiments, the containment induction coil 320c can be energized or de-energized as needed to function as a gate or a valve in the ejection path of the melt from the vessel 312 to the mold 340 and/or to control movement of the melt in the ejection path into the mold 340. For example, when the material 305 is heated/melted by operating the load induction coil 320L, by turning on the containment induction coil 320C the heated material/melt can be contained within the load induction coil 320L; by turning off the containment induction coil 320C, the melt can be ejected from or pushed out of the load induction coil 320L; and/or by turning the containment induction coil 320C back on, e.g., as a portion of the melt passed the "gate region" or the ejection end of the vessel 312, this portion of the melt can keep moving through the transfer sleeve (e.g., a cold sleeve or a shot sleeve) of the mold 340, while the melt portion within the load induction coil 320L can be contained.

In this manner, the vessel 312 is positioned along a horizontal axis (X-axis) such that the movement of the molten material/melt can be in a horizontal direction when directed through the ejection path (e.g., using plunger 330). Surrounding at least part of vessel 312 is load induction coil 320L, and surrounding at least part of the vessel 312 near the ejection end of the vessel 312 is the containment induction coil 320C, such that materials are heated/melted by the load induction coil 320L and contained within the load induction coil 320L.

Figure 5:
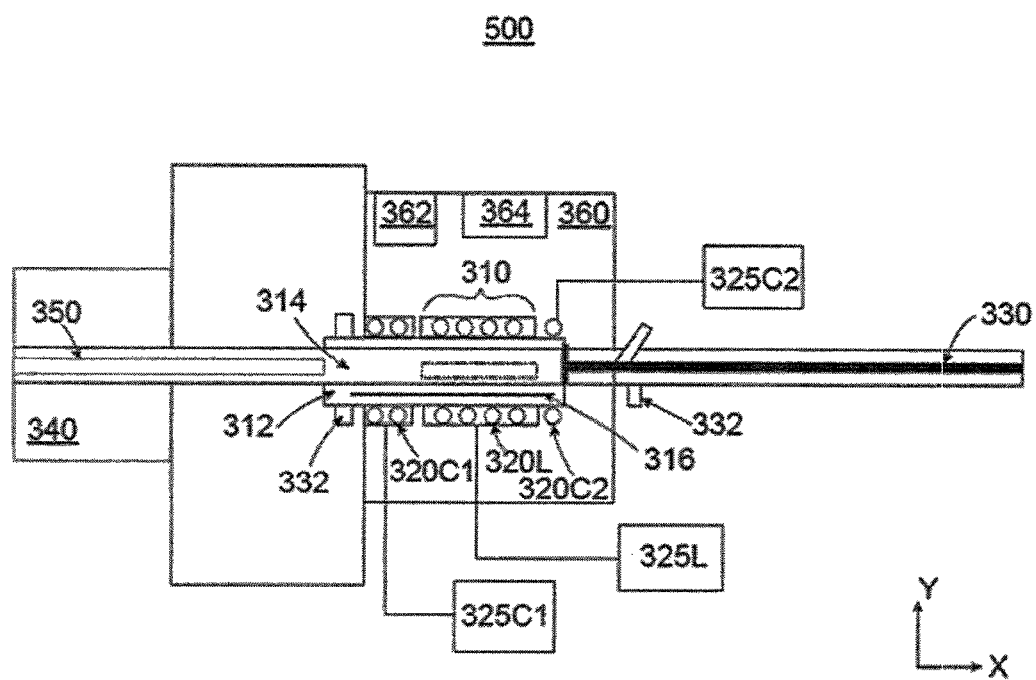
FIG. 5 depicts another exemplary injection molding system/apparatus in accordance with various embodiments of the present teachings.

In embodiments, as shown in FIG. 5, a second containment induction coil 320C2 can be configured in line with the load induction coil 320L at an opposite end of the containment induction coil 320C1, i.e., at an opposite side of the injection path. The first and second containment induction coil 320C1-C2 may be the same or different and may be controlled to have the same or different functions. In this manner, the melt 305 in the vessel 312 can be contained within the load induction coil 320L from both ends thereof.

In embodiments, when utilizing BMG as the material in the injection molding apparatus 300/500, articles/parts with a high elastic limit, corrosion resistance, and low density can be formed.

Figure 6:
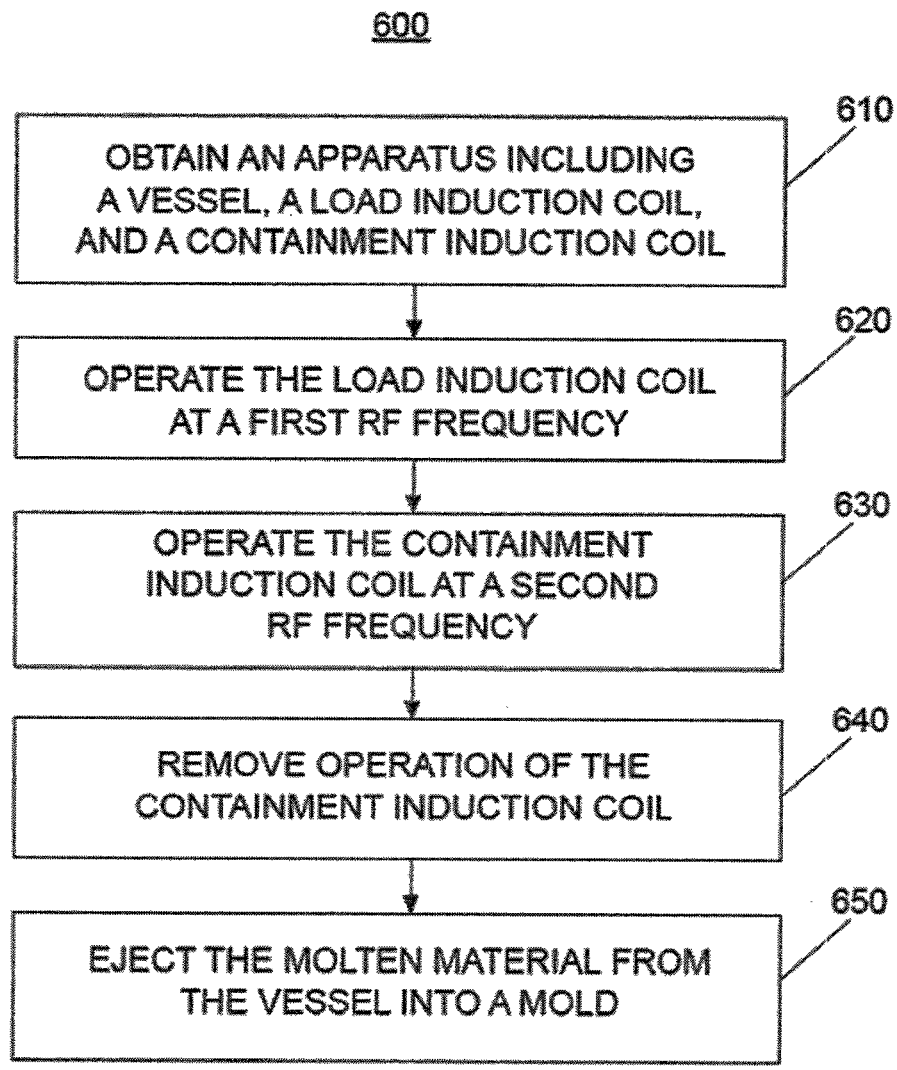
FIG. 6 depicts a method for melting/molding a material in accordance with various embodiments of the present teachings.

FIG. 6 illustrates a method 600 for melting material and/or molding a part in accordance with an embodiment of the disclosure using apparatus 300 and/or 500, as shown in FIGS. 3 and 5, although the apparatus and methods disclosed herein are not limiting with one another in any manner.

At block 610 of FIG. 6, an apparatus is designed to include, for example, a vessel 312 configured to receive a material 305 for melting therein, a load induction coil 320L positioned adjacent the vessel to melt the material 305 therein; and a containment induction coil 320C positioned in line with the load induction coil. Generally, the injection molding apparatus 300/500 may be operated in the following manner: materials for melting 305 (e.g., amorphous alloy or BMG in the form of a single ingot) can be loaded into a feed mechanism (e.g., loading port 318), inserted and received into the melt zone 310 into the vessel 312 (surrounded by the load induction coil 320L). The injection molding machine "nozzle" stroke or plunger 330 can be used to move the material, as needed, into the melting portion 314 of the vessel 312.

At block 620, the material 305 for melting can be heated through the induction process, e.g., by supplying power via a power source 325L to the load induction coil 320L. During heating/melting, a cooling system can be activated to flow a (cooling) fluid in any cooling channel(s) 316 of the vessel 312. The injection molding machine controls the temperature through a closed or opened loop system, which will stabilize the material 305 at a specific temperature (e.g., using a temperature sensor and a controller).

At block 630, the containment induction coil 320C can be operated at a RF frequency lower than the load induction coil 320L to control the position and shape of the molten material or molten feedstock in the inline melting apparatus. The containment induction coil 320C may exert a force, e.g., Laplace forces, on the molten material, acting against those generated by the load induction coil (which tends to push the molten material out) without substantially reducing the inductive heating of the molten material 305.

At block 640, once the desired temperature is achieved and maintained for the melt in the vessel 312, the ejection path of the vessel 312 can be "opened" by turning off the containment induction coil 320C such that the melt/molten material can be subsequently ejected from the vessel into a mold 340 through an ejection path, e.g., the transfer sleeve 350, e.g., as seen at block 650 of FIG. 6. The mold 340 can be any mold in a caster such as a cold chamber die. The ejection can be performed in a horizontal direction (e.g., from right to left as shown in FIGS. 3 and 5) along the horizontal axis (X axis). This may be controlled using plunger 330, which can be activated, e.g., using a servo-driven drive or a hydraulic drive. The mold 340 is configured to receive molten material through an inlet and configured to mold the molten material under vacuum, for example. That is, the molten material is injected into an evacuated cavity between the at least first and second plates to mold the part in the mold 340. As previously noted, in some embodiments, the material may be an amorphous alloy material that is used to mold a bulk amorphous alloy part. Once the mold cavity has begun to fill, pressure (via the plunger) can be held at a given level to "pack" the molten material into the remaining void regions within the mold cavity and mold the material. After the molding process (e.g., approximately 10 to 15 seconds), the vacuum applied to at least the mold 340 (if not the entire apparatus 300/500) can be released. Mold 340 is then opened and the solidified part is exposed to the atmosphere. In embodiments, an ejector mechanism is actuated to eject the solidified, molded object from between the at least first and second plates of mold 340 via an actuation device (not shown). Thereafter, the process can begin again. Mold 340 can then be closed by moving at least the at least first and second plates relative to and towards each other such that the first and second plates are adjacent each other. The melt zone 310 and mold 340 is evacuated via the vacuum source once the plunger 330 has moved back into a load position, in order to insert and melt more material and mold another part.

Although not described in great detail, the disclosed injection system may include additional parts including, but not limited to, one or more sensors, flow meters, etc. (e.g., to monitor temperature, cooling water flow, etc.), and/or one or more controllers. The material to be molded (and/or melted) using any of the embodiments of the injection system as disclosed herein may include any number of materials and should not be limited. In one embodiment, the material to be molded is an amorphous alloy, as described above.

Applications of Embodiments

The presently described apparatus and methods can be used to form various parts or articles, which can be used, for example, for Yankee dryer rolls; automotive and diesel engine piston rings; pump components such as shafts, sleeves, seals, impellers, casing areas, plungers; Wankel engine components such as housing, end plate; and machine elements such as cylinder liners, pistons, valve stems and hydraulic rams. In embodiments, apparatus and methods can be used to form housings or other parts of an electronic device, such as, for example, a part of the housing or casing of the device or an electrical interconnector thereof. The apparatus and methods can also be used to manufacture portions of any consumer electronic device, such as cell phones, desktop computers, laptop computers, and/or portable music players. As used herein, an "electronic device" can refer to any electronic device, such as consumer electronic device. For example, it can be a telephone, such as a cell phone, and/or a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, DVD player, Blu-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard driver tower housing or casing, laptop housing, laptop keyboard, laptop track pad, desktop keyboard, mouse, and speaker. The coating can also be applied to a device such as a watch or a clock.

While the invention is described and illustrated here in the context of a limited number of embodiments, the invention may be embodied in many forms without departing from the spirit of the essential characteristics of the invention. The illustrated and described embodiments, including what is described in the abstract of the disclosure, are therefore to be considered in all respects as illustrative and not restrictive. The scope of the invention is indicated by the appended claims rather than by the foregoing description, and all changes that come within the meaning and range of equivalency of the claims are intended to be embraced therein.

What is claimed is:
1. An apparatus comprising:
    a vessel configured to receive a material for melting therein;
    a first induction coil comprising a number of coil turns defining a melt zone and configured to:
        melt the material, thereby forming a molten material; and while melting the material, impart a first force on the material tending to eject the material from the melt zone along a substantially horizontal direction;
a second induction coil configured to impart a second force to maintain the material in the melt zone and comprising:
a first coil segment; and
a second coil segment positioned in line with and spaced apart from the first coil segment, the first coil segment and the second coil segment being positioned at least partially within the first induction coil; and
a controller configured to cause current to be supplied to the first induction coil and the second induction coil substantially simultaneously, thereby causing the first induction coil to impart the first force on the material while causing the second induction coil to impart the second force on the material.

2. The apparatus of claim 1, wherein the first induction coil and the second induction coil are two distinct induction coils that are unconnected.

3. The apparatus of claim 1, wherein the first coil segment and the second coil segment are connected as part of a single induction coil structure.

4. The apparatus of claim 1, wherein the controller is configured to operate the second induction coil at a lower RF frequency than the first induction coil.

5. The apparatus of claim 1, further comprising:
a mold configured to receive the molten material from the vessel and to form the molten material into a bulk metallic glass (BMG) part; wherein
the first coil segment or the second coil segment of the second induction coil is positioned near an ejection end of the vessel; and
the ejection end of the vessel communicates with an entrance of the mold.

6. The apparatus of claim 5, further comprising an additional induction coil positioned near either the ejection end of the vessel or an opposite end of the vessel and spaced apart from the first induction coil and the second induction coil.

7. The apparatus of claim 1, wherein the second induction coil is configured to function as a valve to control movement of the molten material from the vessel through an ejection path and into a mold by using the controller to stop supplying current to the second induction coil, thereby allowing the molten material to flow into the ejection path.

8. The apparatus of claim 1, wherein the apparatus is configured to:
operate the first induction coil at a first radio frequency to form the molten material in the vessel; and
operate the second induction coil at a second radio frequency to contain the molten material without a vertical wall blocking an ejection path of the vessel.

9. The apparatus of claim 1, wherein the apparatus is configured to operate the second induction coil at a second radio frequency to contain the molten material without a physical object blocking an ejection path of the vessel.

10. An apparatus comprising:
a vessel configured to receive a material for melting therein;
an induction coil system comprising:
a first induction coil comprising a first number of coil turns defining a melt zone and configured to impart a first force in a first direction on the material during melting of the material; and
a second induction coil configured to impart a second force in a second direction opposite the first direction on the material during melting of the material and comprising:
a first segment comprising a second number of turns and positioned at least partially within the first induction coil; and
a second segment comprising a third number of turns and positioned in line with and spaced apart from the first segment, the second segment being positioned at least partially within the first induction coil;
a controller configured to control a supply of current to the first induction coil and the second induction coil to cause the first and second induction coils to impart the first and second forces substantially simultaneously;
a plunger disposed at a side of the melt zone opposite the second induction coil and configured to maintain the material in the melt zone during melting of the material; and
a mold for molding molten material received from the vessel into a molded part.

11. The apparatus of claim 10, wherein the vessel comprises one or more temperature regulating channels below a surface of the vessel that receives the material for melting.

12. The apparatus of claim 10, wherein the mold is a vacuum mold with a vacuum port configured to receive the molten material from the vessel under vacuum supplied by a vacuum source via the vacuum port and to mold the received molten material into the molded part under vacuum.

13. The apparatus of claim 10, wherein the first segment and the second segment are connected as part of a single induction coil structure.

14. The apparatus of claim 13, wherein the first and second induction coils are configured to be operated at different frequencies.

15. The apparatus of claim 10, wherein the second force is greater than the first force.

16. An apparatus comprising:
a vessel configured to receive a material for melting therein;
a first induction coil substantially surrounding at least a portion of the vessel and configured to melt the material and impart a first force in a first direction when the first induction coil is operated at a first frequency;
a second induction coil comprising:
a first coil segment; and
a second coil segment connected to the first coil segment, wherein:
the second induction coil defines a gap between the first coil segment and the second coil segment;
the second induction coil is configured to impart a second force greater than the first force and in a second direction opposite the first direction when the second induction coil is operated at a second frequency; and
the first induction coil encircles a portion of the first coil segment, a portion of the second coil segment, and the gap between the first coil segment and the second coil segment;
a controller configured to control a supply of current to the first induction coil and to the second induction coil;
a plunger disposed at a side of the vessel opposite the second coil segment and configured to maintain the material in a melt zone during melting of the material; and a mold for molding molten material received from the vessel.

17. The apparatus of claim 16, wherein:
the first coil segment has a first number of turns; and
the second coil segment has a second number of turns different than the first number of turns.

18. The apparatus of claim 16, wherein an inner diameter of the first induction coil is greater than an outer diameter of the second induction coil.

19. The apparatus of claim 16, wherein the gap between the first coil segment and the second coil segment is greater than a space between adjacent coils of the first coil segment.

* * * * *